INVENTOR
GUIDO MARTELLI, NERIO MARTELLI
AND FRANCESCO MARTELLI
BY
ATTORNEY

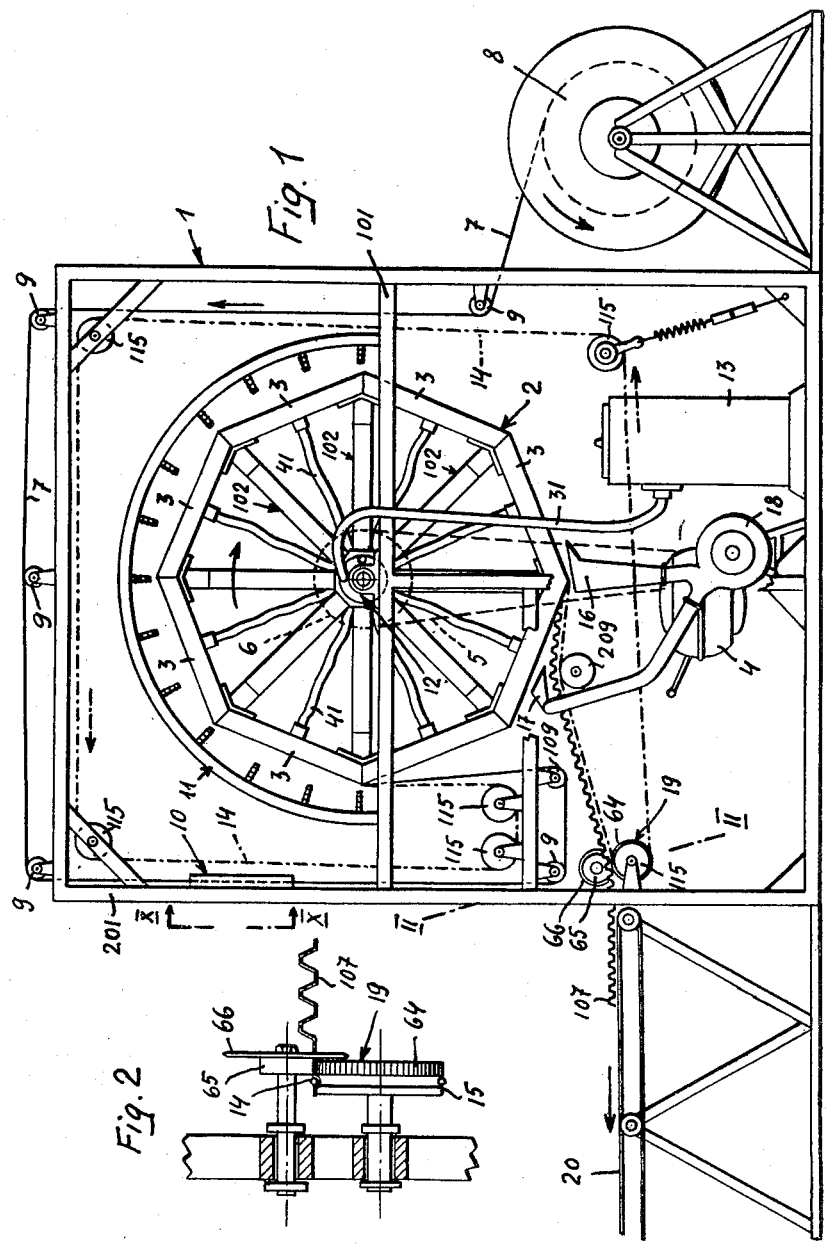

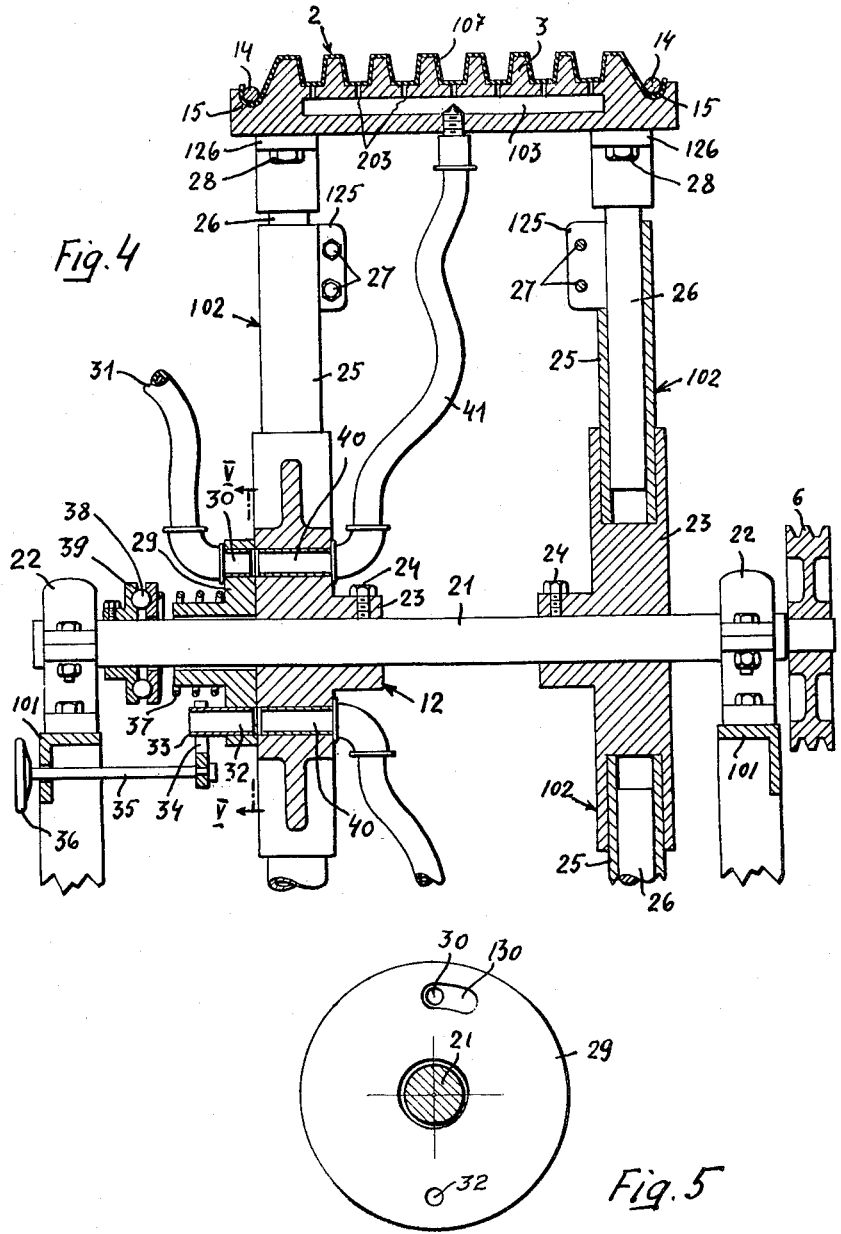

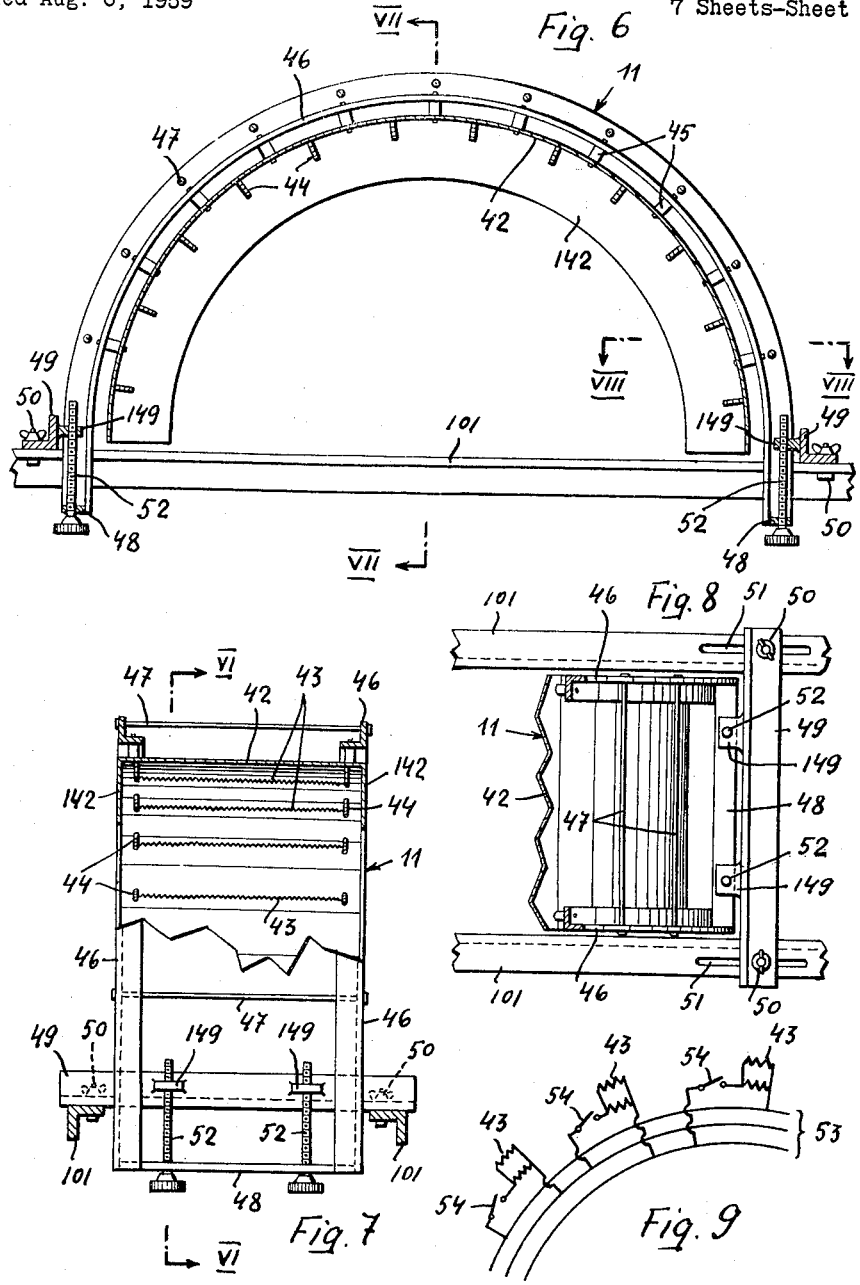

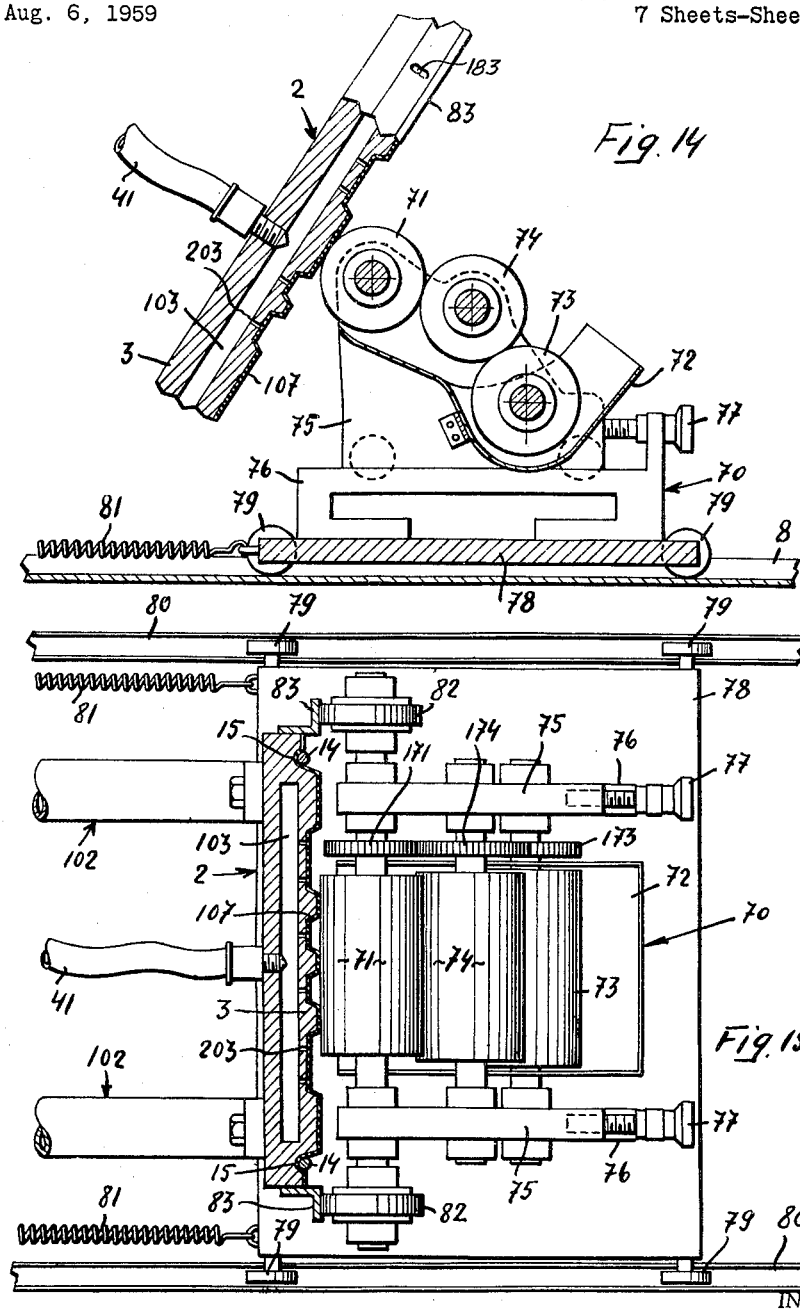

United States Patent Office 3,026,566
Patented Mar. 27, 1962

3,026,566
ROTARY MACHINE FOR THE AUTOMATIC VACUUM FORMING OF CONTINUOUS THERMOPLASTIC BANDS
Guido Martelli, Nerio Martelli, and Francesco Martelli, Bologna, Italy, assignors to Compagnia Italiana Nestpack S.p.A., Bologna, Italy
Filed Aug. 6, 1959, Ser. No. 831,958
Claims priority, application Italy Aug. 7, 1958
15 Claims. (Cl. 18—19)

The present invention relates to some improvements in a rotary machine for the automatic vacuum forming of continuous thermoplastic bands, and more particularly to a high-speed molding machine for the continuous vacuum forming of trays or the like from thermoplastic material, of the kind described in our U.S. Patent No. 2,902,718, granted September 8, 1959. This comprises a rotatably mounted drum, means for rotating the drum, means defining a plurality of independent perforated plates around the periphery of the drum with a plurality of mold surfaces within said mold plates, heating means partially surrounding the periphery of the drum in spaced relation thereto, means for feeding a continuous strip of thermoplastic sheet material onto the periphery of the drum and between the drum and the heating means, suction means in communication with the perforations in the mold areas for drawing the sheet material into engagement with the mold surface of the mold plates, valve means controlling the suction means and operative upon rotation of the drum to place the suction means in communication with the mold plates successively as the respective plates are revolved through the latter part of the zone surrounded by the heating means, sealing means engageable with the sheet material to form an airtight seal with the drum around each of the mold plates, the drum having circumferential grooves on opposite sides of the mold plates, and endless means trained partially around the periphery of the drum and nested in the grooves to overlie and press the sheet material into the grooves in sealing engagement with the endless means and disposed to engage the grooves within the heated zone at a point prior to the operation of the valve means and to which the thermoplastic sheet has been softened by the heating means, whereby the sheet material is softened as it initially passes into the zone surrounded by said heating means, is sealed against the periphery of said drum and then molded by the action of said suction means while in said zone and in a softened condition.

One of the objects of the present invention is to provide a machine of the kind defined, wherein the mold-carrying drum comprises two spoked wheels provided with variable-length spokes, for example telescopic spokes, at least one of such wheels being longitudinally slidably and adjustably mounted on the rotatable shaft thereof, and wherein the molds are interchangeably mounted between the ends of the spokes of both wheels. The width of the molds, therefore, can be changed by changing the relative distance between the two wheels of the driving shaft, whereas the length of the molds can be changed by changing the length of the spokes of said wheels and thus the chordal distance between the ends of the successive spokes.

Another object of the present invention is to provide a machine of the kind described, wherein the automatic vacuum-applying valve device, may be controlled so as to selectively advance or retard, with respect to the position of the heating means, the connection between the molds and the vacuum pump.

A further object of the present invention is to provide a machine of the character described wherein the heating of the continuous thermoplastic sheet material may be selectively controlled by changing the number of the operating electric resistances and/or moving the heating means toward or away from the mold-carrying drum, preferably independently, along two directions which are perpendicular to each other.

A still further object of the present invention is to provide a machine of the character described, having means for laterally guiding the band of thermoplastic sheet material, which maintains the band centered with respect to the mold-carrying drum, and which permits of controlling such centering in accordance with the different-width bands.

Still a further object of the present invention is to provide a machine of the character described wherein completely automatic means are provided for coating with inks, varnishes or the like, the relief-portions of the molded thermoplastic sheet.

Further objects and advantages of the present invention will be apparent from a study of the following detailed description and of the accompanying drawings of which:

FIG. 1 is a side elevational schematic view of an automatic vacuum-forming machine for the vacuum-molding of continuous thermoplastic sheets, in accordance with the present invention.

FIG. 2 is an enlarged sectional view on line II—II of FIG. 1.

FIG. 4 is a radial section of the upper half of the mold-carrying drum.

FIG. 5 is a sectional view on line V—V of FIG. 4.

FIG. 6 is a vertical longitudinal section of the heating means, on line VI—VI of FIG. 7.

FIGS. 7 and 8 are sectional views on line VII—VII and VIII—VIII of FIG. 6, respectively.

FIG. 9 is a schematic view of the heating electrical resistance.

FIGS. 14 and 15 are vertical and plan sections, respectively, of the colouring device for the surface colouring of the relief portions of the molded sheet.

Figure 3:
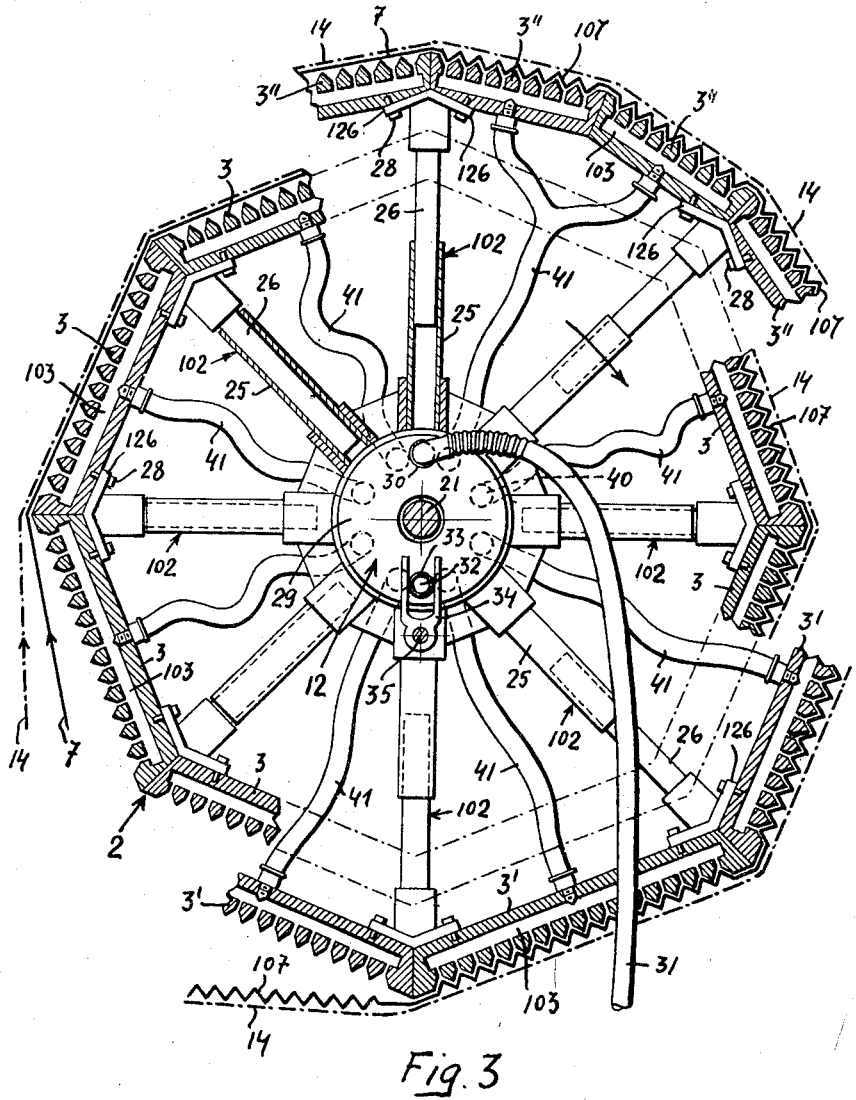
FIG. 3 is a side elevation view, with parts in section, of the mold-carrying drum.

With reference to FIG. 1, the frame of the machine 1 carries a rotatable drum 2 carrying around the periphery thereof vacuum-forming molds 3. The drum is rotated by a variable speed transmission 4, for example, through a belt 5 and pulley 6.

It is to be understood that, although in the drawings each mold 3 is shown as formed by a single body with an internal chamber 103, each mold 3 will comprise a mold-carrying frame adapted to be mounted on the drum 2 and in which the mold proper is to be inserted and fixed in any manner. The mold proper is formed by a plate with a shaped or corrugated outer molding face and is mounted in the mold-carrying frame so to form an internal chamber 103. The arrangement is such as to permit replacement of the molds proper without removing the mold-carrying frame from the drum 2. The term "mold" as used in the following specification and in the appended claims, therefore, means either a single piece mold, as shown, or a mold formed by a mold-carrying frame or the like, and a shaped plate or mold proper interchangeably inserted and fixed in said mold-carrying frame.

The band of continuous thermoplastic sheet 7 is unrolled from the roll 8 which is provided with a suitable brake (not shown), and after passing a set of guide rollers 9, 109 and through a guiding and centering device 10, it is passed around a mold-carrying drum 2, and tightly surrounds the upper half and a portion of the lower half thereof.

A heating device 11 is provided around the upper half of the mold-carrying drum 2, and is adapted to heat the continuous thermoplastic sheet 7 when it passes the heating device while moved by the drum 2 until sheet 7 becomes plastic. In addition, the machine comprises an automatic vacuum-applying valve device 12 adapted to connect, for a short period, the individual molds 3 to a vacuum pump 13 adapted to suck the plasticized sheet 7 against the molds 3 and cause same to assume the shape thereof (see FIGS. 3 and 4).

The necessary airtight seal for effectively sucking the continuous sheet 7 against the molds 3 is attained by means of two endless metallic cords 14 which extend tautly around the pulleys 115 and around the mold-carrying drum 2. Cords 14 press into suitable marginal grooves 15 of the molds 3, both side margins of the plastified sheet 7 or, alternately, of the molded sheet 107 (see also FIG. 4). The path of movement of said cords 14 is such that the continuous sheet 7 can easily move into a position between the mold-carrying drum 2 and the cords 14.

Thereafter, near the end of the arc of the mold-carrying drum 2 covered by the thermoplastic sheet 7, 107, the vacuum-applying valve device 12 puts the individual molds 3 into communication with the atmosphere, thus eliminating the sucking effect and allowing detachment of the molded sheet 107 from the drum 2 simultaneously with the sealing cords 14 (see also FIG. 3). Preferably, a blower 18 feeds air to two nozzles 16, 17 provided at the point where the molded sheet 107 detaches from the mold carrying drum 2. The nozzle 16 blows cool air against the external surface of the molded sheet 107, and the nozzle 17 similarly blows cool air between the molded sheet 107 and the drum 2, thus facilitating the detachment of the sheet from the molds 3. The molded sheet 107, then passes over a further supporting roller 209 and through an edge trimming device 19, whereafter it discharges onto an endless conveyor belt 20.

The hereinbefore mentioned parts and devices are constructed as follows.

The mold-carrying drum 2 comprises two wheels with variable-length spokes 102. These wheels are longitudinally adjustably mounted on the shaft 21 which is rotatably journaled in the bearings 22 on the horizontal beams 101 of the frame 1 and which shaft is driven through the pulley 6 and belt 5 by the variable speed transmission 4 (FIGS. 3 and 4). Each of said wheels comprises a hub 23 axially slidably mounted on the shaft 21 and adapted to be locked thereon in the desired position, for example by means of radial setscrews 24. The hub 23 is provided with a number of telescopic spokes 102 each comprising a tubular member 25 integral with the hub 23 and a rod 26 axially slidable in said tubular member 25 and provided at its outer ends with flanges 126. The end of each tubular member 25 is longitudinally slit for a certain distance and is adapted to be positively tightened around the rod 26 by means of bolts 27 passing through aligned holes in opposing lugs 125 secured on tubular member 25 at both sides of its longitudinal end slit. The rods 26 can so be locked in the respective tubular members 25 at any desired extended position, which permits of selectively and continuously controlling the length of the spokes 102.

Each mold 3 (which may be plane, as shown, or arcuate, or angle-shaped) is detachably mounted on both wheels between successive spokes 102 thereof and is fixed, for example, by means of screws 28 to the terminal flanges 126 of rods 26. Thus, by changing the distance between the wheels, that is locking them at a greater or smaller relative distance apart on the shaft 21, it will be possible to use molds 3 having a corresponding greater or smaller width. Alternatively, by changing the length of the telescopic spokes 102, and thus the chordal distance between the ends of successive spokes, it will be possible to use molds 3 having a corresponding length which is comprised within a broad range. Thus, for example, at the left in FIG. 3, the telescopic spokes 102 are shown in the most retracted or shortest condition, and molds 3 which are mounted therebetween are each the shortest molds that can be mounted between two successive spokes, in the case of a single plane mold being mounted between two successive spokes.

Alternately, at the right upper portion in FIG. 3, the telescopic spokes are appreciably extended, permitting the mounting therebetween of single molds 3' appreciably longer than molds 3.

Two molds 3", considerably shorter than molds 3 can be mounted between two successive spokes 102 abutting against each other and secured to each other, as shown in the upper portion of FIG. 3. In a similar manner and in combination with the length variation of the telescopic spokes 102, it is possible to change the total number of molds mounted on drum 2.

The vacuum-applying valve device 12 comprises a disc 29 slidable on the shaft 21 but not rotatable therewith (FIGS. 3 and 4). The disc 29 is provided in its upper portion, at the angular position where the molds 3 are to be connected to the vacuum pump 13, with an eccentric hole 30 connected to this pump through a pipe 31 at least a portion of which is flexible. The disc 29 is provided in a lateral or in the lower portion thereof, and anyway at the angular position where the molds 3 are to be connected to the atmosphere, with a further eccentric hole 32 lying on the same circumference as the hole 30 and extended outwardly by means of a sleeve 33. This sleeve 33 engages a swinging fork 34 secured, for example, to a rotatable spindle 35 which can be manually rotated by means of a handwheel 36. The fork 34 prevents the disc 29 from rotating with the shaft 21 and permits, at the same time, when made to swing due to rotation of spindle 35, angular movement of the disc 29 on shaft 21. The disc 29 has a sealing sliding contact with a side of the hub 23 of one of the wheels forming the mold-carrying drum 2, and it is axially pushed against said hub 23 by a spring 37 reacting through a thrust ball or roll bearing 38 against a flange 39 secured to the shaft 21 and axially adjustable thereon.

On the same circumference as the holes 30, 32 in the disc 29, the hub 23 co-operating with said disc is provided with a circumferential series of angularly equidistant axial through holes 40, each of which is connected, on the side opposite to disc 29, through a pipe 41, to the chamber 103 of one of the molds 3.

Thus, when a hole 40 of the rotating hub 23 is aligned with the hole 30 of the stationary disc 29, it will permit a temporary communication between the vacuum pump 13 and the respective mold 3 and therefore the suction will draw the plastified sheet 7 against the mold 3 through the little conduits 203 from the chamber 103 to the outer surface of the mold within the depressed portions or cavities thereof. Thereafter, when the same hole 40 of the rotating hub 23 is aligned with the hole 32 of the stationary disc 29, it will connect for a short period its respective mold with the atmosphere, eliminating the vacuum existing therein. The exact moment in which the molds 3 are connected either to the vacuum pump 13 or, respectively, to the atmosphere may be selectively varied within a certain limited range by angularly adjusting the disc 29 on the shaft 21 by means of the swingable fork 34, that is, by changing the angular position of the holes 30, 32 with respect to the heating device 11.

In order to connect each mold 3 to the vacuum pump and to effect a longer sucking action on the plastic sheet 7, the hole 30 on disc 29 has, on the internal face of the latter co-operating with the hub 23, an angularly long-shaped opening, or it opens into a corresponding angularly elongated cavity 130 on the internal face of the disc 29, as shown in FIG. 5.

The heating device 11 comprises a semi-cylindrical shield 42 surrounding the upper half of the mold-carrying drum 2 and provided on its internal surface with electrical heating elements 43 placed between insulators 44 (FIGS. 6 to 8). In addition, the shield 42 is provided with semiannular diaphragms 142 for the purpose of retaining heat, particularly at the peripheral edges of mold-carrying drum 2, so to uniformly heat and soften the marginal portions of the thermoplastic continuous sheet 7 and particularly those marginal portions pressed into the lateral grooves 15 of the molds 3 by the metallic cords 14. In fact, the portion of plastified sheet pressed between cords 14 and the bottom of the grooves 15 on the mold-carrying drum 2 acts as a sealing gasket preventing the entrance of external air into the space between the molds 3 and the sheet 7.

The shield 42 is suspended by means of supports 45, preferably insulating supports, from two metallic arched beams 46 connected to each other by means of the rods 47 and, at the lower ends thereof, by means of transverse bars 48. The pair of metallic arched beams 46 is vertically adjustably supported by a pair of transverse bars 49 which are in turn supported on the two longitudinal beams 101 of frame 1 at both sides of the mold-carrying drum 2 and which are longitudinally slidable and adjustable on said beams.

Transverse bars 49 are connected to beams 101 by means of bolts 50 fitting through longitudinal slots therein, whereby the said transverse bars may be longitudinally moved along the beams and fixed thereon at the desired position.

Screw tierods 52, provided with large thumb-heads are passed from below through the lower transverse bar 48 of the two arched beams 46 and are screwed into upstanding lugs 149 of the supporting transverse bars 49. The two arched beams 46 are therefore supported, through the lower transverse bars 48, by the heads of the screw tierods 52 and may be moved upwardly or downwardly with respect to the supporting beams 101 by screwing or unscrewing tierods 52 with respect to the lugs 149 of the transverse bars 49. Thus, the whole heating device may be vertically moved towards or away from the underlying mold-carrying drum 2 and/or horizontally moved out of center with respect to the same, in order to enable it to be adjusted to the most suitable position for proper heating of the thermoplastic sheet 7.

Another control of the heating may be obtained by connecting the electrical resistances 43, individually or in groups, through independent switches 54, to the feeding line 53, so as to enable them to be shut off separately, as desired, i.e. one or more resistances 43 or, alternately, one or more groups of resistances, as shown in FIG. 9.

Figure 10:
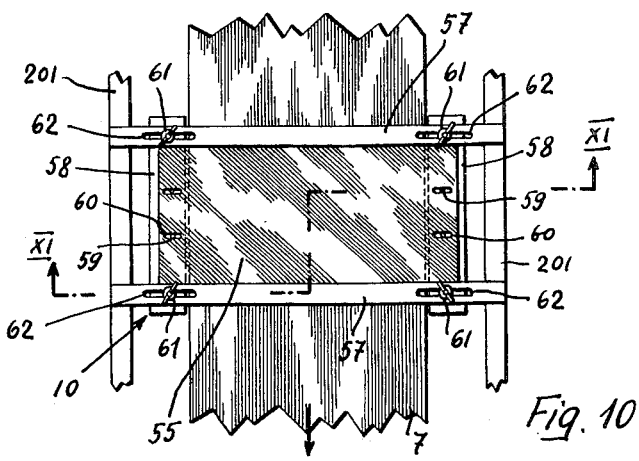
FIG. 10 is a front elevational view of the guiding and centering means for the continuous thermoplastic sheet, taken in the direction of the arrows on line X—X of FIG. 1.
Figure 11:
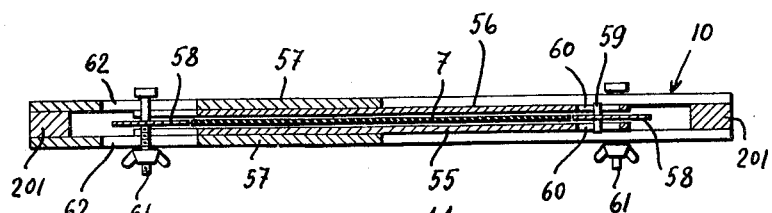
FIG. 11 is a section on line XI—XI of FIG. 10.

The device 10 for laterally guiding and centering the continuous thermoplastic sheet 7 comprises two parallel plates 55, 56 which are secured, by means of transverse bars 57, to a pair of vertical members 201 of frame 1. The continuous sheet 7 is passed with small clearance between the two parallel plates 55, 56 (FIGS. 10 and 11). Two parallel guide plates 58 are provided between plates 55, 56 on both sides of the sheet 7, which are very close or contact the margins of the sheet 7 and which are laterally movable with respect thereto, for example, by means of pins 59 integral therewith which are engaged in lateral slots 60 in the plates 55, 56. Guide plates 58 are adapted to be fixed in the desired position by means of bolts 61 connected thereto and passing through slots 62 in transverse bars 57. By adjusting the position of the two guide plates 58 to prevent lateral movement of the sheet 7, the guiding device 10 may be adapted for use with continuous sheets of different widths and may be adjusted so that the sheet 7 will be maintained accurately centered on the mold-carrying drum 2, thus assuring that both side edges of the sheet will be engaged by the metallic sealing cords 14.

Figure 12:
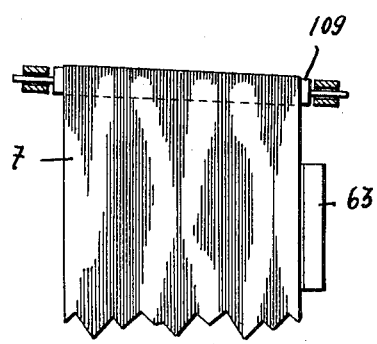
FIG. 12 is a schematic view of another embodiment of the guiding and centering means for the continuous thermoplastic sheet.

A simplified embodiment of a guiding and centering device for the thermoplastic sheet 7 is shown in FIG. 12 and consists of giving a slight inclination to the penultimate or the last guide roller 109 of such sheet with respect to the preceding guide rollers 9, that is, with respect to a transverse line perpendicular to the path of movement of the sheet 7. Thus, the sheet 7 tends to constantly move laterally on the inclined roller 109 toward the same side of the roller (towards right FIG. 12) and maintains its corresponding edge adjacent a stationary guide plate 63 and therefore moves to and maintains automatically the same position at all times. In order to adjust the centering of the thermoplastic sheet 7 with respect to the mold carrying drum 2, and to obtain such centering with continuous sheets of different width, the guide plate 63 is moved laterally with respect to the sheet.

The device 19 for the side edge trimming of the molded sheet 107 (FIG. 2) comprises a corrugated or toothed wheel 64 on each side of the sheet, which is connected to the guide pulley 115 of the respective sealing cord 14. The molded sheet passes over wheel 64 and is pressed thereagainst by a pressing wheel 65 secured to a rotary disc cutter 66 which cuts off the sheet marginal strip which has been deformed by the sealing cord 14. In order to obtain a high cutting speed the disc cutter 66 has a somewhat larger diameter than the pressing wheel 65 secured thereto.

Sometimes it may be necessary to render the relief portions of the molded sheet 107 more noticeable, for example, by giving them a colour contrasting with the remaining portions of the sheet and/or render them opaque if the sheets are transparent. This is the case, for example, of molded sheets 107 comprised in a packing and having high-relief or low-relief inscriptions or vignettes. To this end, in accordance with the invention, the above described automatic rotary machine is provided with an automatic device adapted to coat with a uniform and thin film of colouring substance, as ink, varnish and the like, all relief surfaces of the formed sheet 107 or at least a portion thereof, all this being performed on the rotary drum 2, after the suction-drawing of the plastified thermoplastic sheet into the molds 3 and whilst the sheet is still thereon.

Figure 13:
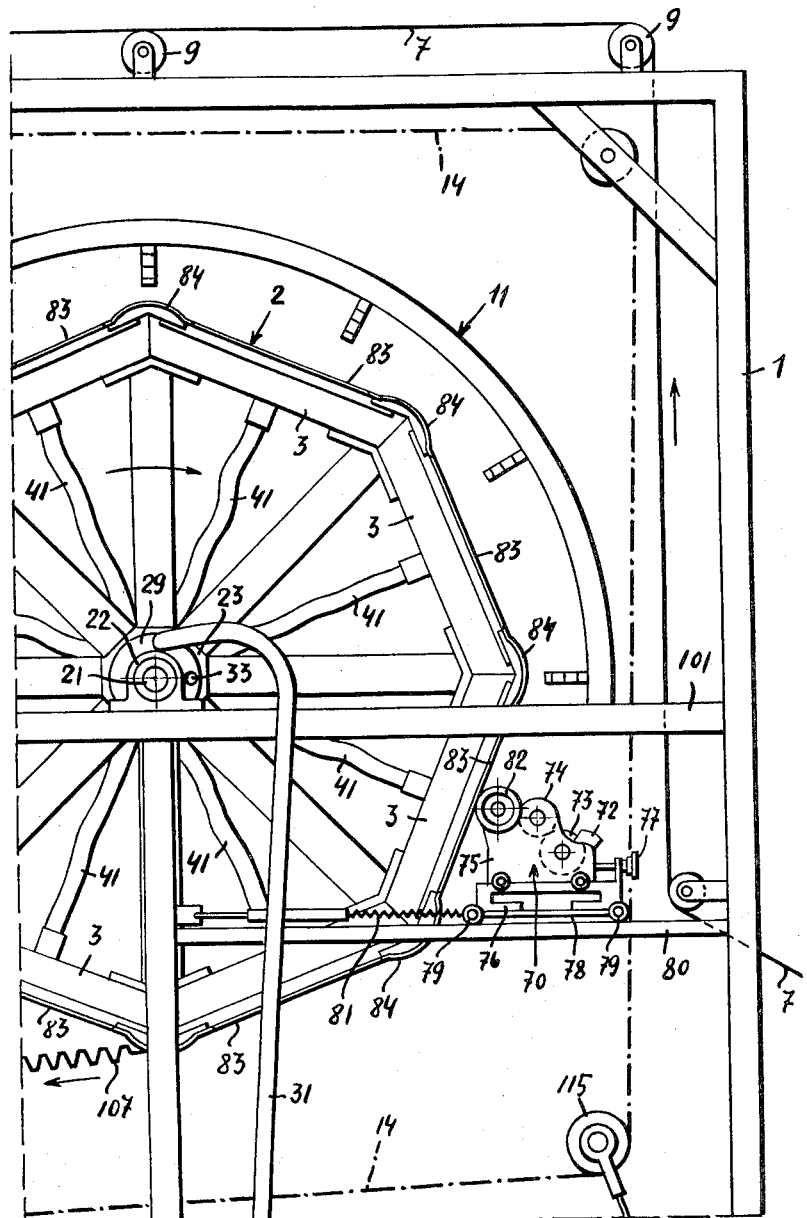
FIG. 13 is an elevation view of a portion of an automatic rotary machine for the vacuum-molding of continuous thermoplastic sheets as in FIG. 1, provided with means for the surface colouring of the relief-portions of the molded sheet.

In accordance with the invention, a preferred embodiment of the above described improvement is shown in FIGS. 13 to 15. A colouring device 70 adapted to be used with colouring ink, varnish and the like is mounted opposite the drum 2 and after the heating device 11, that is, at the portion of the drum 2 between the end of the heating device 11 and the point where the molded sheet 107 detaches from the drum 2.

The coating device 70 is of the roller type and comprises a coating roller 71 the axis of which is parallel to the axis of the drum 2 and, therefore, to the surface of the individual flat molds 3, which receive the ink or varnish from a cup-tank 72 through a drawing roller 73 immersed in the tank and through an intermediate transfer roller 74. The rollers 71, 73 and 74, which are parallel and adjacent each other, and the tank 72 are mounted between two side members which in turn are mounted on two plane guides 76 so as to slide to and from the drum 2, and are adjustable along said guides by means of screws 77. The guides 76 are secured to a supporting carriage 78 slidably mounted, through lateral parallel plates 80 secured to the frame 1 of the machine. Springs 81 urge the carriage 78 toward the drum 2, whereby the coating roller 71 is constantly urged toward the relief-portions of the mold 3 facing the coating device 70 and therefore contacts the outer surface of the molded thermoplastic sheet 107 covering the relief-portions of the mold.

In the embodiment of FIG. 15, the coating roller 71 extends for only a portion of the width of the molds 3. Of course, it might extend over the whole width of the molds. In addition, it is to be noted that the guides 80 and springs 81 are laterally mounted at both sides of the drum 2 in a manner so as not to interfere therewith and which permits of the molds passing freely therebetween.

Rollers 71, 74 and 73 are connected to each other by means of gears 171, 174 and 173. A dolly-wheel 82, which may be rubber-tired, is fixedly mounted on each end of the shaft of the coating roller 71, laterally of the side members 75. These dolly-wheels 82 are urged by springs 81 against rails 83, preferably knurled, mounted on both sides of molds 3, outside of the grooves 15 for the sealing cords 14. The rails 83 on each mold are preferably adjustable radially of the drum 2 and to this end they are connected to the mold 3, for example, by means of screws passing through radial slots 183 (see FIG. 14). In addition, the rails 83 on two successive molds are connected to each other, at the angular connection between these molds, by means of arcuate joints 84. The dolly-wheels 82 have the same diameter as the coating roller 71, and the outer surface of the rails 83 is adjusted to be co-planar with the surface of the relief-portions of the molded thermoplastic sheet 107, the arrangement being such to assure each mold, by the action of the springs 81, of contact of the coating roller 71 with the relief-portions of the molded sheet 107 and the simultaneous contact of the dolly-wheels 82 on the rails 83.

In such conditions, by rotating the drum 2, the dolly-wheels 82 roll along the rails 83 and rotate the coating roller 71 which in turn rotates the rollers 74, 73 through gears 171, 174, 173 and simultaneously rolls on the mold 3 contacting the surfaces of the relief-portions of the continuous thermoplastic sheet 107, thus providing a uniform and neat colouring of said surfaces. In addition, due to the polygonal configuration of the drum 2, the whole colouring device 70 moves with the carriage 78 back and forth along the guides 80, said device being urged inwardly towards the drum by the springs 81, and being urged outwardly by the action of the rails 83 of the drum on the dolly-wheels 82.

Thus, in spite of the polygonal configuration of the drum 2 with the molds 3, the present invention assures a continuous contact of the coating roller 71 against the relief-surfaces of the molded sheet 107, and a uniform pressure of said roller against said surface to be coloured.

In addition, the peripheral speed of the coating roller 71 at all times is equal to the speed of the drum 2, which latter speed changes along each individual mold 3 due to the variable eccentricity of the periphery of the drum. Finally, due to the fact that rotation of the coating roller 71 is caused by the rolling of suitable dolly-wheels 82 on continuous rails 83 (and not, for example by the rolling of the coating roller 71 itself on the surface to be coloured), the coating roller will be made to constantly and uniformly rotate with the other rollers co-operating therewith, even when the relief-surfaces to be coloured are relatively small or discontinuous.

At the connections between the individual molds 3, the convex joints 84 between the individual rails 83 urge the carriage 78 and the coating device 70 outwardly to such an extent that the coating roller 71 will be completely detached from the molded thermoplastic sheet 107 and will be smoothly returned against the successive mold 3. Similar convex portions, adapted to detach the coating roller 71 from the thermoplastic sheet 107 may be provided also on the rails 83 along the molds, at the points where the relief-surfaces of the molded sheet 107 are not to be coloured.

While we have described our improved rotary vacuum forming machine in more or less detail, it is, nevertheless, desired that this detailed description be considered merely as illustrative and not as limiting, and it is to be understood that changes and modifications in details of construction, arrangement and operation, as well as choice of materials, may be made by those skilled in this art, without departing from the invention as defined in the following claims.

We claim:
1. A high-speed molding machine for continuously forming trays or the like from thermoplastic material, comprising a rotatably mounted drum, means for rotating said drum, a plurality of molds around the periphery of said drum, means for feeding a continuous strip of thermoplastic sheet material onto the periphery of said drum, means for moving the sheet material into engagement with the mold surfaces of said molds, said drum including two spoked wheels, a rotatable shaft on which said wheels are mounted, means for varying the length of said spokes, at least one of the said spoked wheels being mounted axially shiftable on the said shaft, means for locking the said shiftable wheel in said shifted position on said shaft, and means for fastening the molds to the spokes of the two spoked wheels.

2. A machine according to claim 1, wherein each of the said spoked wheels includes a hub mounted axially sliding on the said rotatable shaft, means for locking said hub on said shaft in a preselected position corresponding to the width of the said mold plates to be fastened on the said drum, a plurality of circumferentially spaced spokes projecting radially from, and secured with one end to the said hub, and means on the other end of the said spokes for securing the said molds.

3. A machine according to claim 1, wherein each of the said spoked wheels includes a hub mounted axially sliding on the said rotatable shaft, means for locking said hub on said shaft in a preselected position corresponding to the width of the said mold plates to be fastened on the said drum, a plurality of circumferentially spaced spokes projecting radially from and secured with one end to the said hub, the said spokes each being formed in two sections telescopically slidable with respect to each other in a radial direction, means for interlocking the said spoke sections in a predetermined extended position, and flange coupling means on the other ends of said spokes for securing the said molds to the said spokes.

4. A high-speed molding machine for continuously forming trays or the like from thermoplastic material, comprising a rotatably mounted drum, means for rotating said drum, a plurality of perforated molds around the periphery of said drum, means for feeding a continuous strip of thermoplastic sheet material onto the periphery of said drum, suction means in communication with the perforations in said molds for drawing the sheet material into engagement with the mold surfaces of said molds, valve means controlling said suction means and operative upon rotation of said drum to place said suction means in communication with said molds successively, and sealing means engageable with the sheet material to form an airtight seal with said drum around each of said molds, said valve means including two parallel tightly adhering discs coaxial to the drum, one of said discs being connected to the said drum and provided with a set of axial through-holes arranged in a circular path and each connected to one of the molds of the drum, the other disc being stationary and provided on the level of the circular path of said first disc with two circumferentially spaced axial through-holes, one of said holes being connected to the said suction means, the other being in communication with the atmosphere, means for holding the said second disc, and means for selectively advancing and delaying the suction in the molds with respect to the angular position of the heating means and including means for angularly adjusting the said second disc for the purpose of changing the moment of coincidence of the suction hole of the said disc with the holes of the said first disc.

5. A machine according to claim 4, wherein the said second disc is rotatably and shiftably mounted on the rotating shaft of the drum and is held axially against the said first disc in preselected angular positions by a spring compressed between said disc and a thrust bearing.

6. A machine according to claim 4, wherein said holding means and the angular adjusting means of said second disc includes a swinging fork in engagement with one eccentric projection of said second disc, manually controlled means for swinging the said fork in a preselected angularly adjusted position, and manually controlled locking means for locking the said fork in the said position.

7. A machine according to claim 4, wherein the said through hole of the said second disc connected to the said suction means is provided on the surface of the said second disc facing the surface of the said first disc with one circumferentially extending elongated output port.

8. A high-speed molding machine for continuously forming trays or the like from thermoplastic material, comprising a rotatably mounted drum, means for rotating said drum, a plurality of independent mold plates around the periphery of said drum with a plurality of mold surfaces within said mold plates, means for feeding a continuous strip of thermoplastic sheet material onto the periphery of said drum, means for moving the sheet material into engagement with the mold surfaces of said mold plates, means for heating the sheet material to soften said material and permit its shaping to the mold surfaces, and means for coating the relief surfaces of the sheet material with a thin film of coloring material after heating and molding and before molded thermoplastic sheet leaves the mold plates, said coating means including a carrier movable to and from said drum, means for guiding the carrier in its movement to and from the drum, and spring means for constantly urging the carrier toward the drum.

9. A machine according to claim 8, wherein the said coating means further includes a rotatable coating roller, a tank containing the colouring material, transfer rollers for continuously transferring a thin uniform layer of the colouring material from the tank to the coating roller, and coupling means for effectively coupling the coating roller to the transfer rollers.

10. A machine according to claim 8, wherein said coating means further includes a rotatable coating roller, guide means on the lateral edges of the mold plates secured to the drum, means on the coating roller coacting with the guide means on the mold plates for limiting movement of the coating roller toward the drum under urgency of said spring means to the plane of the relief surfaces of the molded sheet material with respect to the mold plates, and means for radially adjusting the guide means on the mold plates.

11. A machine according to claim 8, wherein the coating means further includes a rotatable coating roller, guide means on the lateral edges of the mold plates secured to the drum, means on the coating roller coacting with the guide means on the mold plates for limiting movement of the coating roller toward the drum under urgency of said spring means to the plane of the relief surfaces of the molded sheet material respect to the mold plates, and convex shaped guide means for interconnecting the lateral guide means on one mold plate with the lateral guide means on the adjacent mold plates.

12. A machine according to claim 8, wherein the coating means includes a rotatable coating roller, guide means on the lateral edges of the mold plates secured to the drum, means on the coating roller coacting with the guide means on the mold plates for limiting movement of the coating roller toward the drum under urgency of said spring means to the plane of the relief surfaces of the molded sheet material in the mold plates, the guide means on the mold plates being provided with cam shaped surfaces for lifting the coating roller from the molded thermoplastic sheet.

13. A high speed machine for continuously forming trays or the like from thermoplastic sheet material comprising a machine frame, a drum mounted for rotation on said frame, means for rotating said drum, a plurality of molds around the periphery of said drum, means for feeding a continuous length of thermoplastic sheet material onto the periphery of said drum, means for moving the sheet material into engagement with the mold surfaces of said molds, heating means partially surrounding the periphery of said drum in spaced relation thereto, said drum including two wheels each having a hub and telescoping spokes projecting radially therefrom, a shaft on which said hubs are mounted, means for retaining said telescoping spokes in any adjusted position, one of said hubs being axially movable on said shaft, means for clamping said hub in adjusted position on said shaft, and means for moving said heating means with respect to said hubs and for retaining said heating means in adjusted position.

14. A high speed molding machine for continuously forming trays or the like from thermoplastic material, comprising a frame having horizontal beams, a drum rotatably mounted on said frame, means for rotating said drum, said drum including two spoked wheels, a horizontal shaft on which said wheels are mounted, means for varying the length of said spokes, at least one of the spoked wheels being mounted axially shiftable on said shaft, means for locking the shiftable wheel on said shaft, a plurality of molds around the periphery of said drum fastened to the spokes of the wheels, heating means partially surrounding the periphery of the upper half of said drum in spaced relation thereto, means for feeding a continuous strip of thermoplastic sheet material onto the periphery of said drum and between said drum and said heating means, suction means for moving the sheet material into engagement with the mold surfaces of said molds while the sheet material is subjected to heat from the heating means and is in a softened condition, and carrier means for adjustably displacing said heating means in two normal directions with respect to the said drum.

15. A machine according to claim 14, wherein said carrier means comprises two arched beams, an arched shield on said beams, cross members for connecting the ends of said beams, two cross bars bearing on the horizontal beams of the machine frame, means for shifting said two cross bars lengthwise of said beams, vertically adjustable tie means overhanging the cross members, and said heating means includes insulating means securing electric heating elements inside said shield, means for connecting said heating elements to a power source, and independent switches in said connecting means for controlling the heating elements singly or in groups.

References Cited in the file of this patent

UNITED STATES PATENTS

| | | |
|---|---|---|
| 2,377,946 | Leary | June 12, 1945 |
| 2,526,634 | Chavannes | Oct. 24, 1950 |
| 2,529,830 | Bierer | Nov. 14, 1950 |
| 2,660,757 | Smith | Dec. 1, 1953 |
| 2,681,612 | Reimann | June 22, 1954 |
| 2,902,718 | Martelli et al. | Sept. 8, 1959 |

FOREIGN PATENTS

| | | |
|---|---|---|
| 1,166,775 | France | June 23, 1958 |
| 545,595 | Italy | July 3, 1956 |
| 549,149 | Italy | Oct. 6, 1956 |